United States Patent [19]

Wachs et al.

[11] 4,131,923
[45] Dec. 26, 1978

[54] MAGNETIC-HEAD LOCATING ARRANGEMENT FOR FLOPPY-DISK MECHANISMS

[75] Inventors: Walter Wachs, Krailling; Heinz Stickel, Munich, both of Germany

[73] Assignee: Siemens Aktiengesellschaft, Berlin & Munich, Germany

[21] Appl. No.: 849,955

[22] Filed: Nov. 9, 1977

[30] Foreign Application Priority Data

Nov. 12, 1976 [DE] Fed. Rep. of Germany ....... 2651733

[51] Int. Cl.² .................. G11B 5/55; G11B 21/08; G11B 21/14
[52] U.S. Cl. .................. 360/106; 360/109
[58] Field of Search ................. 360/106, 109; 74/567

[56] References Cited

U.S. PATENT DOCUMENTS

| 3,210,082 | 10/1965 | Murata | 360/101 |
| 3,693,982 | 9/1972 | Barnett et al. | 360/106 |
| 3,715,523 | 2/1973 | Rousseau et al. | 360/106 |

FOREIGN PATENT DOCUMENTS 2353643  5/1975  Fed. Rep. of Germany ........... 360/106

Primary Examiner—Robert S. Tupper
Attorney, Agent, or Firm—Hill, Gross, Simpson, Van Santen, Steadman, Chiara & Simpson

[57] ABSTRACT

In one illustrated embodiment a generally conical locating member for a transducer head has a guide surface extending thereabout in successive turns of progressively increasing radius. In another embodiment two generally conical sections provide respective axially oppositely directed guide surfaces whose pitch runs in the same direction such that with head locating arms resiliently engaging the respective guide surfaces, the head is always positively locked with the angular position of the conical drive member. With a stepping motor drive, the guide surface or surfaces may comprise successive flat faces each having a tangential extent to compensate for maximum error in stepping angle. The conical members are made by injection molding for least possible cost.

5 Claims, 5 Drawing Figures

MAGNETIC-HEAD LOCATING ARRANGEMENT FOR FLOPPY-DISK MECHANISMS

BACKGROUND OF THE INVENTION

The invention relates to a device for locating recording heads such as magnetic heads and the like.

With so-called floppy-disk mechanisms with which information can be imparted to, read from, or erased from a flexible magnetizable disk with the aid of a magnetic head, particularly precise adjustment and location of the magnetic head is essential because of the high density of the information on the plate or disk.

To this end it is known for the magnetic head mounted in guide rails to be located with the aid of a spindle. In this case the spindle is made of precisely turned steel, the production of which is very costly because of the precision required.

It is also known for the magnetic head to be driven by means of a spiral disk produced by a plastic injection-molding process. Here the recording head assembly carrying the magnetic head engages in guides in the driving spiral through a protuberance.

SUMMARY OF THE INVENTION

The object of the invention is to create a device with which it is possible to move a magnetic head radially in relation to a magnetic plate with sufficient precision and the least possible cost. The device is to be producible using injection-molding and exhibit as small a moment of inertia as possible.

This objective is achieved in accordance with the invention in that a spiral cone is provided to serve as drive element for the recording head, the spiral faces of this cone acting as guide faces for the recording head.

In a preferred embodiment, the spiral cone is constructed in the form of a double cone comprising two identical axially arranged halves, each of which is provided with a spiral whose flanks face away from one another. As compared with the simple spiral cone, the preferred embodiment has the advantage in that the recording head is in complete positive locking connection with the drive element.

In one particularly advantageous embodiment of the invention locating faces running in orbital track sections lying at right angles to the axis of rotation and associated with the individual locating points of the recording head are disposed on the flanks of the spiral cone for the purpose of compensating for any error in stepping angle that may arise when stepping motors are used.

The entire device has the great advantage that it can be made easily and economically using a plastic injection-molding process and yet offers a very high degree of precision in the adjustment of the magnetic head. By virtue of the low moment of inertia of the driven spiral cone it is possible to make the driving stepping motor relatively small. This means that any error in the stepping angle arising in the stepping motor is completely balanced out and cannot affect the precision of adjustment of the magnetic head.

Other objects, features and advantages of the invention will be apparent from the following detailed description taken in connection with the accompanying sheets of drawings.

DETAILED DESCRIPTION OF THE PREFERRED EMBODIMENTS

Figure 1:
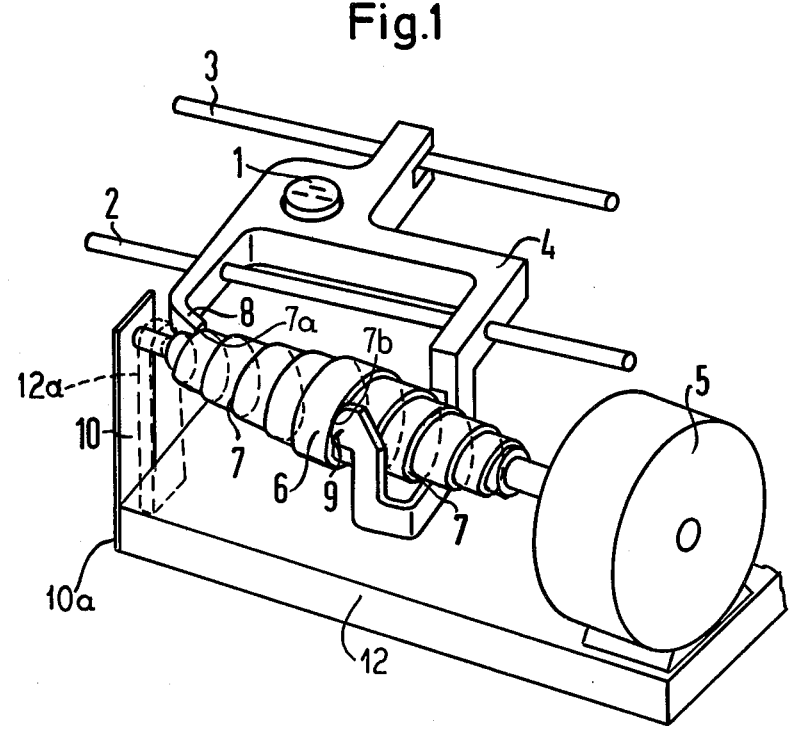
FIG. 1 shows one embodiment of the invention with a spiral cone constructed in the form of a double cone, the spiral flanks of which exhibiting a continuous pitch.

In a mechanism (not shown here) for a so-called floppy-disk arrangement in which information can be stored on a flexible magnetizable disk or retrieved with the aid of a magnetic head, the magnetic head 1 is disposed on a pick-up carriage 4 displaceable along guide rods 2 and 3. The displacement of the pick-up carriage 4 and thus the location of the magnetic head on the magnetizable disk is achieved with the aid of a stationary stepping motor 5 that is rigidly coupled to a spiral cone 6. The spiral cone 6 is constructed in the form of a double cone with two identical axially disposed halves each having one spiral 7, the flanks of which are turned away from one another. The pitch of both spirals 7 runs in the same direction and displacement of the head locating points of the spirals 7 is proportional to the rotary travel of the cone 6 over its entire length. In addition the spirals 7 are so designed that the gap between the head locating points on both spirals always stays the same throughout each 360° revolution of the cone 6. The spiral flanks 7 serve as guide faces for the recording head carriage 4 which engages in the spiral cone 6 through a rigid arm 8 and a sprung arm 9. The arm 9 is sprung so as to ensure there is no play in the engagement between the arm 8 and the spiral cone 6.

The central longitudinal axis of the spiral cone 6 forms an angle with the guide rods 2 and 3 so that the generatrices of the two cone halves along which the two arms 8 and 9 of the carriage 4 move are parallel with the guide rods 2 and 3. And in order to minimize as far as possible any discrepancies caused by thermal expansion in the direction of displacement of the plastic carriage 4, the magnetic head 1 is fitted level with the arm 8 bearing on the spiral cone in relation to the direction of advance. And so as to be able to balance out the axial play that can arise in the stepping motor as well with this embodiment example, a leaf spring 10 is provided, bearing flexibly on the shaft of the spiral cone 6.

Figure 2:
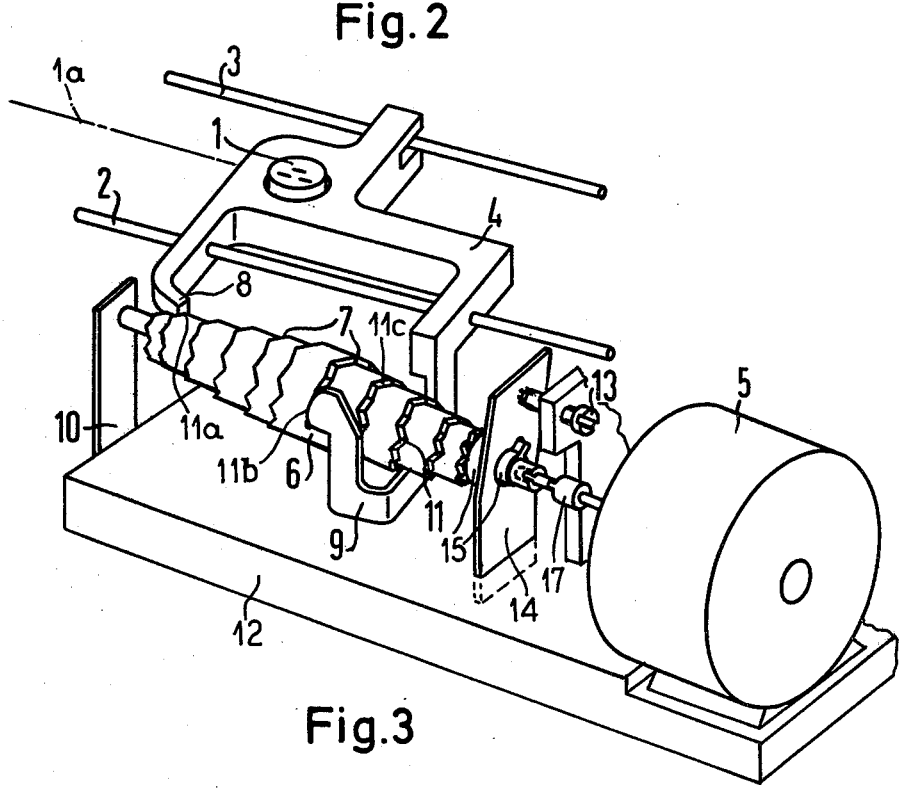
FIG. 2 shows an embodiment of the invention in which locating faces are disposed on the flanks of the spiral cone, running in orbital track sections lying at right angles to the axis of rotation.

To compensate for the stepping angle error occurring with and conditional on the design of a stepping motor 5, with the embodiment of the invention shown in FIG. 2, locating faces 11 associated with the individual locating points for the recording head 4 and running in orbital track sections lying at right angles to the axis of rotation are disposed on the flanks 7 of the spiral cone 6. The size of these flat faces is determined by the maximum stepping angle error of the motor 5. Thus the precision of location of the magnetic head 1 is basically influenced solely by the axial distance between the pitchless locating faces 11. The required precision of return in the location of the magnetic head 1 necessitates particularly exact axial adjustment of the spiral cone 6 and through this of the magnetic head 1 relative to a reference track on the mini-disk with the very high information density that is normal. This can be achieved extremely easily with the aid of one of the devices shown in FIG. 3 and FIG. 4. For this purpose in FIG. 3 the spiral cone 6 is mounted displaceable axially with one end (not shown) in a frame 12 and the other on the drive shaft of the stationary stepping motor 5. The spiral cone 6 is adjusted axially with the aid of an adjusting screw 13 that bears on the spiral cone 6 through the intermediary of a pre-loaded leaf spring 14 mounted in the frame. To ensure that the exact position of the spiral cone 6 is maintained for a complete revolution and is not disadvantageously influenced by the force-locking contact, a bushing 15 is centered on the spiral cone 6 and locked so that it cannot turn relative to the leaf spring 14. In addition the bush is spaced radially relative to the leaf spring 14 and provided with a knife-edge 16 at the point where it bears on the latter. The axially adjustable connection between spiral cone 6 and stepping motor 5 is established through a coupling piece 17.

Figure 4:
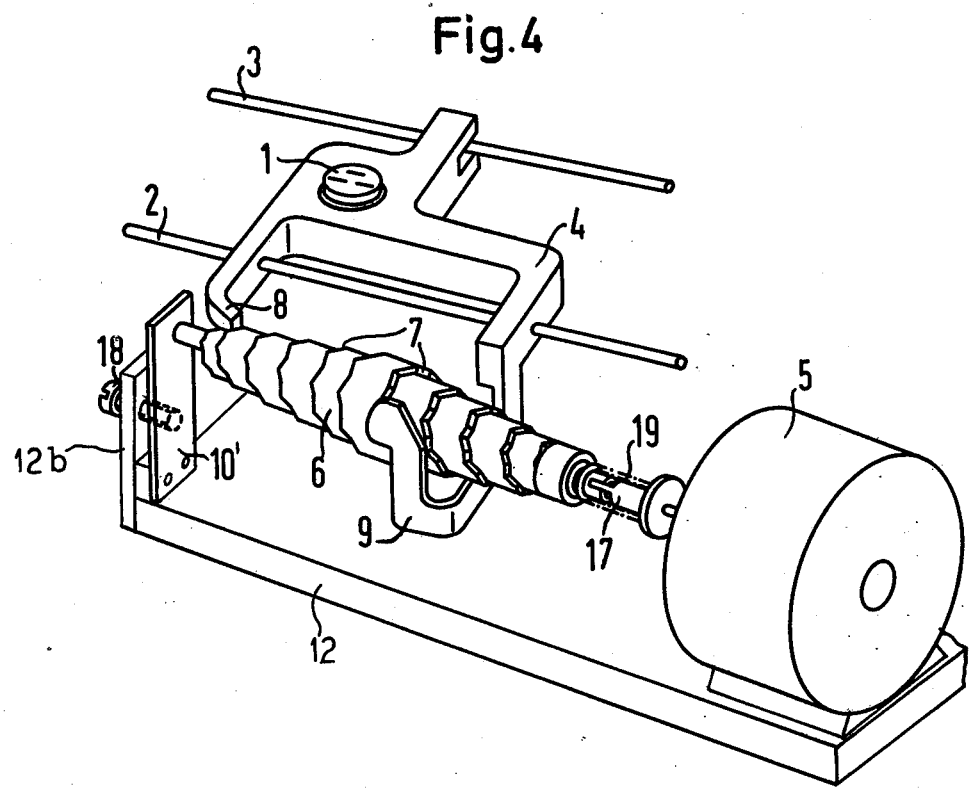
FIG. 4 shows a diagrammatic illustration of one particularly advantageous adjusting device for the spiral cone.

Axial adjustment of the spiral cone 6 is particularly simple with the aid of the adjusting device shown in FIG. 4. The pre-loaded leaf spring 10' and thus the spiral cone 6 is moved axially against the loading of a compression spring 19 by turning an adjusting screw 18. Here the coupling piece 17 connecting the stepping motor 5 with the spiral cone 6 simultaneously serves as abutment and centering for the compression spring 19. In this way any axial play in the stepping motor 5 is neutralized.

The invention has the great advantage that the spiral can be made simply with great precision using the plastic injection-molding process in one half tool. The stepping motor can be made relatively small because of the low moment of rotation of the spiral cone and the favorable leverage.

Figure 3:
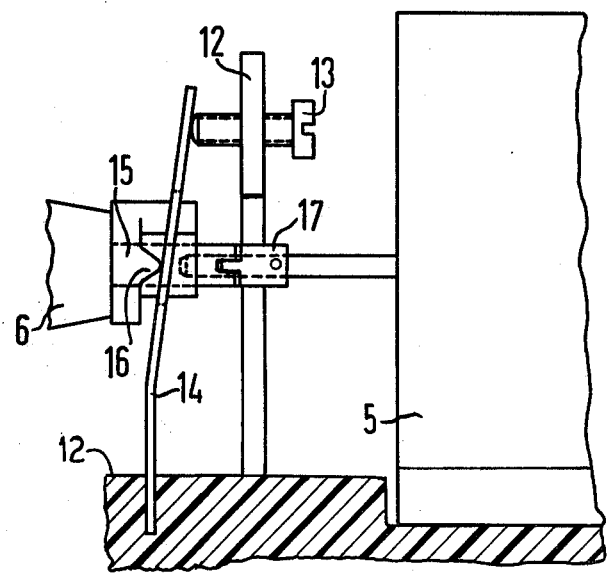
FIG. 3 shows a diagrammatic illustration of a device for adjusting the spiral cone.

By way of amplification of the foregoing description, in FIGS. 1-4, further portions of frame 12 have been indicated, the frame providing fixed support for the casing of stepping motor 5 and providing a journal 12a, FIG. 1, for the left end of cone 6, the journal providing for the desired axial adjustment of the cone 6 by means of adjusting screw 13, FIG. 2, with the preloaded leaf spring 10 serving to urge the cone 6 to the right as viewed in FIGS. 1 and 2, and the lower end 10a, FIG. 1, of leaf spring 10 being also secured by means of frame 12. Thus, to adjust cone 6 to the left, adjusting screw 13, FIGS. 2 and 3, is rotated in a direction so as to advance the end thereof to the left, the leftward adjustment of cone 6 being accommodated by deflection of the upper end of leaf spring 10. Similarly, by rotating adjusting screw 13 in the opposite direction, the preloading of leaf spring 10 serves to shift the cone 6 to the right, the slot of coupling piece 17 having sufficient axial clearance to accommodate the desired range of axial shifting of cone 6 relative to stepping motor 5.

In the embodiment of FIG. 4, compression spring 19 may exert sufficient force so that flexible element 10' is in engagement with adjusting screw 18 in all positions of screw 18 relative to the frame indicated at 12b.

Figure 5:
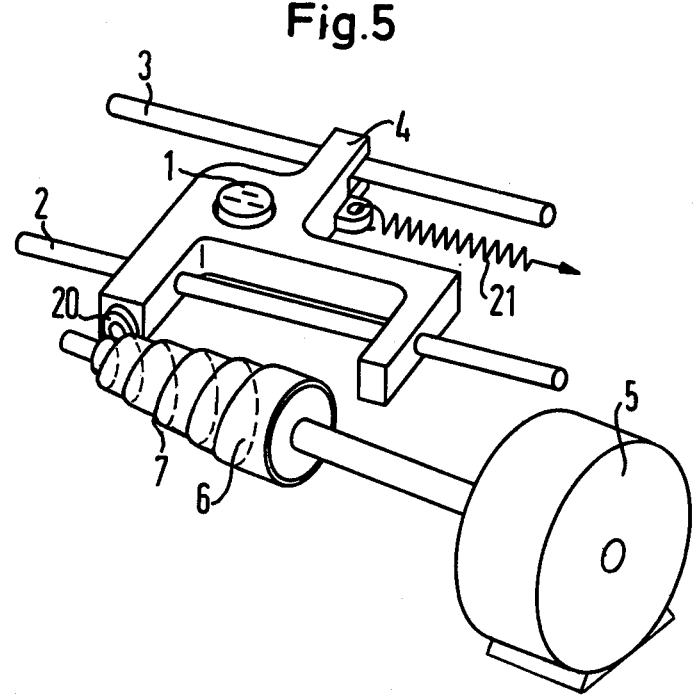
FIG. 5 shows an embodiment of the invention wherein the spiral cone is constructed in the form of an axial half of a double cone.

In each of the embodiments, locating means for the transducer head assembly 1 serves to move the head along a head path such as indicated at 1a in FIG. 2 which is parallel to the guide rods 2 and 3. The head path 1a may correspond to a radial line relative to a center of rotation of a disk-like record medium. The guide surface means of the spirals 7 may comprise respective series of oppositely directed locating faces such as 7a, 7b, FIG. 1, which are equally angularly offset along the respective spirals, and which are connected by respective smoothly continuous surfaces along which the arms 8 and 9 smoothly track during rotation of the cone 6 by means of the stepping motor 5. On the other hand, in the embodiments of FIGS. 2 and 4, the head locating faces 11 include the faces 11a and 11b shown as engaging arms 8 and 9 in FIG. 2 and may lie essentially in planes at right angles to the head path 1a such that the head 1 remains essentially stationary during the slight rotational movement of the cone 6 necessary to cause traverse of a locating face 11 by an arm such as 8 or 9. The tangentially extending locating faces 11 may be joined by axially inclined connecting surfaces such as 11c, with the locating faces 11 being equally angularly offset along the spirals 7. The tangential extent of the locating faces preferably corresponds to the maximum error in stepping angle for the particular stepping motor 5 such that any error in the stepping angle is completely balanced out and cannot affect the precision of adjustment of the magnetic head. The embodiment of FIG. 5 may have bias means such as 10, FIG. 1; or adjustment means such as 13-17, FIGS. 2 and 3, or 17-19, FIG. 4.

It will be apparent that many modifications and variations may be effected without departing from the scope of the novel concepts and teachings of the present invention.

We claim as our invention:

1. A device for moving a magnetic head between various tracks on a recording carrier, in which the magnetic head is mounted on a carriage which is displaced utilizing a positioning motor, comprising a spiral cone (6) driven by the positioning motor (5), said spiral cone having a generally conical surface provided with inclined spiral flanks (7) forming a spiral screw of constant pitch on the conical surface, said spiral flanks having a radius which varies in proportion to the associated diameter of the spiral cone (6), and said carriage has at least one projection engaging the spiral flank (7) of the spiral cone (6) with said spiral cone being positioned such that the generatrix of the spiral flank along which the projection moves forms a line parallel to the motion direction of the carriage (4) whereby the magnetic head (1) and the carriage (4) are displaced with each revolution of the spiral cone (6).

2. A device according to claim 1 characterized in that the spiral cone has first and second generally conical sections having respective first and second generally conical surfaces provided with respective first and second spiral flanks running in said spiral screw fashion on the respective first and second generally conical surfaces.

3. A device according to claim 2 characterized in that the carriage has two projections, each coupling the carriage to one section of the spiral cone with the head, each projection bearing on a respective first and second spiral flank, and means biasing at least one of the projections into contact with its associated spiral flank.

4. A device according to claim 1 including an adjusting means for adjustably moving the spiral cone in an axial direction, wherein the adjusting means comprises a flexible element bearing on the spiral cone at one end, an adjusting screw for adjustably pressing the flexible element toward the spiral cone for adjusting the spiral cone in an axial direction, a coupling means coupling the positioning motor with the spiral cone to accommodate longitudinal adjustment of the spiral cone, and a compression spring associated with the coupling means and positioned to act on the spiral cone in a longitudinal direction oppositely to that of the adjusting screw.

5. A device in accordance with claim 1, characterized in that discrete locating faces (11) are provided on the spiral flanks (7), that the locating faces (11) are connected with one another by the spiral flanks (7) running in said spiral screw fashion, that said locating faces do not have an incline and locate the various tracks to be scanned by the magnetic head (1) on the recording carrier.

* * * * *